United States Patent
Schmidt et al.

[11] Patent Number: 6,080,934
[45] Date of Patent: Jun. 27, 2000

[54] CABLE PROBE

[75] Inventors: Robert Schmidt, Steinen; Jürgen Hässler, Rümmingen, both of Germany

[73] Assignee: Endress + Hauser GmbH + Co., Marlburg, Germany

[21] Appl. No.: 09/010,406

[22] Filed: Jan. 21, 1998

[30] Foreign Application Priority Data

Feb. 5, 1997 [EP] European Pat. Off. ............. 97101766

[51] Int. Cl.⁷ .................................................. H02G 15/02
[52] U.S. Cl. .................. 174/74 R; 174/74 A; 174/84 R; 73/866.5
[58] Field of Search ............................ 174/74 A, 106 R, 174/102 R; 73/866.5, 170.33; 52/604, 128

[56] References Cited

U.S. PATENT DOCUMENTS

| | | | |
|---|---|---|---|
| 4,010,706 | 3/1977 | Pretet | 114/245 |
| 4,056,887 | 11/1977 | Tucker et al. | 33/126.6 |
| 4,673,819 | 6/1987 | Rose | 250/573 |
| 4,713,967 | 12/1987 | Overs et al. | 73/170 A |
| 4,899,499 | 2/1990 | Hoekstra | 52/146 |
| 5,046,359 | 9/1991 | Layport | 73/170 |
| 5,383,259 | 1/1995 | McIntire | 124/300 |
| 5,402,165 | 3/1995 | Linville et al. | 348/85 |
| 5,439,800 | 8/1995 | Thompson | 435/9 |
| 5,440,081 | 8/1995 | Thompson | 181/102 |
| 5,550,331 | 8/1996 | Thompson | 181/102 |
| 5,661,251 | 8/1997 | Cummings et al. | 73/866.5 |
| 5,815,264 | 9/1998 | Reed et al. | 356/336 |
| 5,827,985 | 10/1998 | Grieger et al. | 73/866.5 |

FOREIGN PATENT DOCUMENTS

| | | |
|---|---|---|
| 2071424 | 12/1993 | Canada . |
| 33 89 96 | 7/1921 | Germany . |
| 91 03 122 | 9/1991 | Germany . |

*Primary Examiner*—Kristine Kincaid
*Assistant Examiner*—William H Mayo, III
*Attorney, Agent, or Firm*—Bose McKinney & Evans LLP

[57] ABSTRACT

A cable probe is provided which can be installed without special tools, in which the fixing of the cable (3) is achieved by tensile forces acting on the cable (3), and in which the cable (3) can be shortened by the customer to a length corresponding to requirements. It has a cable fixing device which has a member (4) with an axial, conical internal bore (41) tapering in the direction away from the housing. Arranged in the member (4) is a cone (5) tapering in the direction away from the housing, which tightly encloses the cable (3) and can be displaced thereon only by an external force, and which has an axial cylindrical bore (51) through which the cable (3) is guided and cut-outs (52) extending in the longitudinal direction of the cone and passing through the wall of the cone (5), whereby the cone (5) can be compressed in the radial direction so that the internal diameter of the cone (5) can be reduced.

13 Claims, 2 Drawing Sheets

CABLE PROBE

FIELD OF THE INVENTION

The invention relates to cable probes having a housing fixed at a measuring location, especially on a vessel, having a probe, a cable leading from the housing to the probe and a cable fixing device arranged on the housing,

BACKGROUND OF THE INVENTION

Cable probe devices are frequently used when a probe, for example a capacitive filling-level measuring device or a pressure sensor, has to be positioned in a location which is not readily accessible. An example of this is the introduction of a probe at a particular level in a tank or vessel. The cable serves to secure the probe. At the same time, the electrical supply and the transmission of information, especially of measurement signals, can pass via this connection between probe and housing.

In order for such cable probe devices to be suitable for industrial use, it is necessary to ensure that the cable and its fixing device withstand all process-induced stresses, in particular high tensile forces. Preferably, the fixing device also withstands, in addition, those tensile forces which result in the parting of the cable, for example tensile forces of several thousand newton.

Simplicity of handling, for example installation without special tools, is advantageous. Furthermore, in order to reduce any storage that may be necessary, provision is to made for the cable to be capable of being shortened by the customer to a length corresponding to requirements.

In the above mentioned commercially available probes, the cable passes between two clamping blocks which engage with one another via a toothing In assembly, the clamping blocks have to be placed against the cable and held there. The package comprising cable and clamping blocks is then introduced into a housing section which tapers in the direction away from the housing. The clamping blocks are likewise tapered in the direction away from the housing. Once the clamping blocks have been introduced sufficiently far into the housing section, the cable is firmly clamped by them and the housing section. The clamping blocks are moved in the housing section, in the direction away from the housing, by tensile forces now acting on the cable. As a result of the tapering of the section in this direction, the clamping is further tightened by this movement.

A disadvantage of such a cable probe device is that two clamping blocks are necessary)to secure the cable and cannot be fixedly connected to the cable, as it will otherwise no longer be possible for them to be pushed into each other via the toothing. As a result, the fixing device only engages when the clamping blocks have been introduced sufficiently far into the housing section. If this has not been done in advance, the clamping blocks do not bear tightly on the cable and the latter slips through the clamping blocks even under a low tensile stress.

The object of the invention is to provide a cable probe device which can be simply installed without special tools, in which the fixing of the cable takes place as a result of tensile forces acting on the cable, and in which the cable can be shortened by the customer to a length corresponding to requirements.

This object is achieved, according to the invention, in that the cable fixing device has a member having an axial, conical internal bore tapering in the direction away from the housing. In the axial, conical internal bore is arranged a cone tapering in the direction away from the housing. The cone tightly encloses the cable and can be displaced thereon only by an external force. The core has an axial cylindrical bore through which the cable is guided, and has cut-outs extending in the longitudinal direction of the cone and passing through the wall of the cone, as a result of which the cone can be compressed in the radial direction in a manner such that the internal diameter of the con e can be reduced.

According to one embodiment, the member is arranged in a section of the housing and rests on a sealing member, encompassing the cable, which sealing member in turn rests on a step, adjoining a cable exit aperture, of the section.

According to a further embodiment, an inner lateral surface of the cone is roughened. The inner lateral surface of the cone has in particular a structuring of saw-toothed grooves running around in an annular manner.

In an alternative embodiment, the cut-outs are arranged symmetrically in the cone.

In another alternative embodiment, each end surface of the cone is broken by at least one cut-out.

The cuts, in the yet another embodiment, each further take the form of a gap and a web extends between closely neighboring cut-outs.

In yet a further embodiment, the cut-outs are arranged in groups, one group comprising at least two rows of cut-outs arranged parallel to each other and parallel to the longitudinal axis of the cone, and a narrow wall strip existing between the rows.

In another alternative embodiment, the webs are each placed at the height of the center of the cut-out arranged extending respectively parallel thereto in the adjoining row.

In yet another embodiment, the cone consists of a rigid plastic, especially of a polyester, for example polybutyleneterephthalate, or a polyamide.

BRIEF DESCRIPTION OF THE DRAWINGS

The invention and its advantages are now explained in detail with reference to the figures of the drawing, in which an example of embodiment is shown; identical members are provided in the figures with identical reference numerals.

DETAILED DESCRIPTION OF THE PREFERRED EMBODIMENTS

Figure 1:
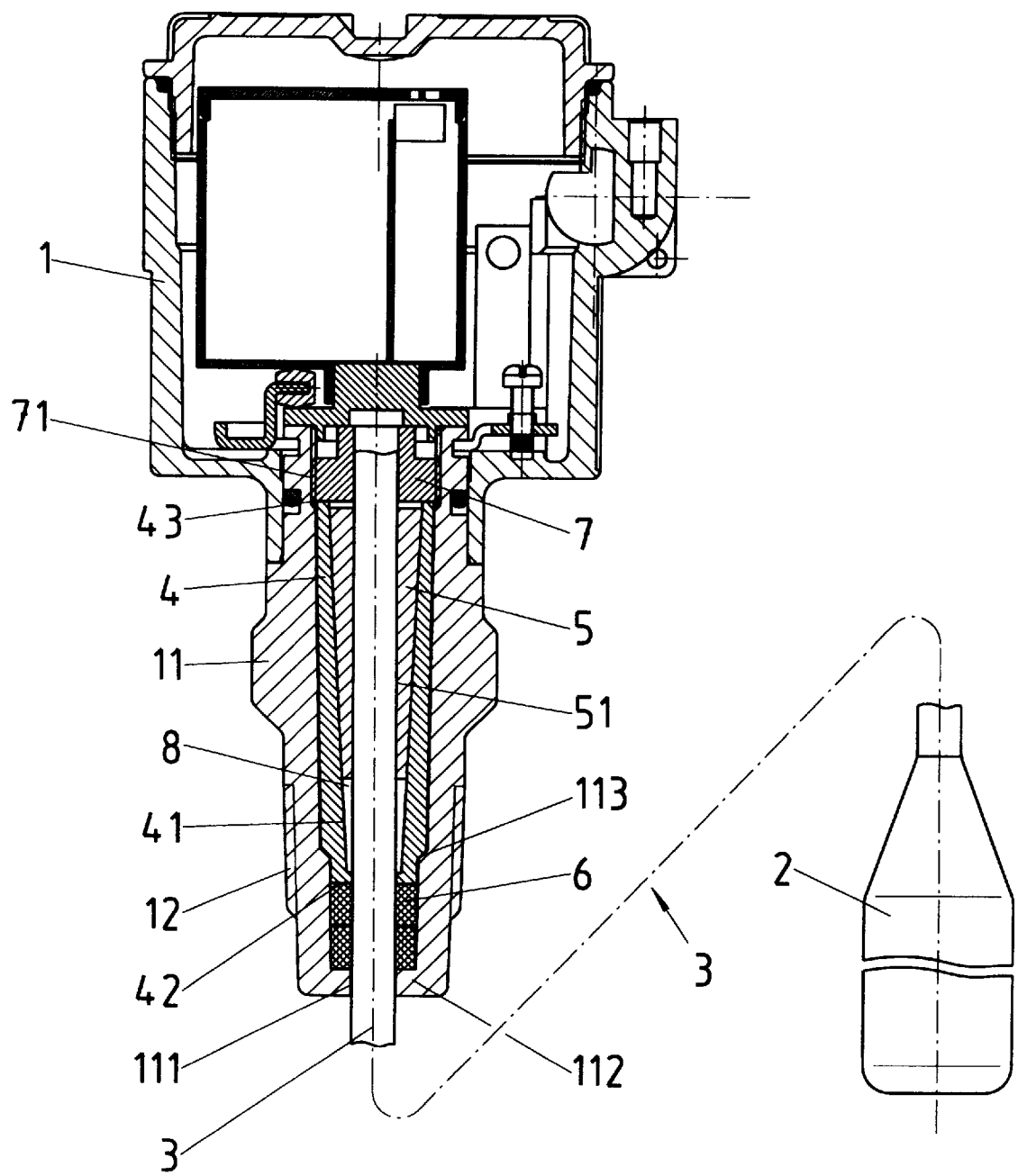
FIG. 1 shows a longitudinal section through a cable probe device.

An exemplary of embodiment of a cable probe according to the invention shown in FIG. 1. The exemplary cable probe device has a housing 1 and a probe 2. The probe 2 is connected by a cable 3 to the housing 1. The probe 2 is, for example, a capacitive filling-level measuring device, a pressure sensor or another measuring device.

Conventionally, the cable 3 is a single-strand or multi-strand cabled wire which has a tensile strength corresponding to the application and preferably has an electrical shield. Both requirements are met by cabled wires which are surrounded externally by an insulation made from a plastic and, below that, by metal braiding.

The cable 3 serves to secure the probe 2. The electrical supply to the probe 2 and the transmission of information, especially of measurement signals, can also pass via this connection. Arranged in the housing 1 is, for example, an electronic analyzer, not shown in FIG. 1, for the further processing and/or display of the measured values from the probe 2.

The housing 1 consists, for example, of a metal or a strong plastic. It has a substantially cylindrical section 11, onto which an external thread 12 is molded. By means of this, the housing 1 can be screwed into an aperture of a vessel, not shown in FIG. 1. The housing 1 can of course also be mounted by another fixing method known to those skilled in the art, for example by means of flanges.

The housing 1 is closed by a step 112 forming the base of the substantially cylindrical section 11. This step has a central bore as a cable exit aperture 111. Arranged in the interior of the section 11 is a substantially cylindrical member 4. A narrow gap exists between this and the inner surface of the section 11. The member 4 has an annular stepped surface, whereby it bears on a shoulder 113 of the section 11, which runs around in an annular manner and extends radially into the interior of the section 11.

The member 4 preferably consists of a rigid plastic, especially a polyester, for example polybutyleneterephthalate, or a polyamide. The member 4 rests with a first annular end surface 42 on a sealing member 6 arranged on the step 112 and encompassing the cable 3. A thrust collar 7 is provided and is screwed into the section 11 by means of an external thread 71 from the side of the section 11 remote from the sealing element. The thrust collar 7 is thus tensioned by a frontal surface against a second end surface 43 of the member 4. The member 4 is thereby pressed against the sealing member 6, which exerts its effect as a result. Since the member 4 is pressed by the thrust collar 7 against the shoulder 113, a defined pressure acts on the sealing member 6.

Arranged in the interior of the section 11 is a cable fixing device. This comprises the member 4 and a specially designed cone 5 arranged therein. The member 4 has an axial conical internal bore 41 which tapers in the direction away from the housing. The diameter of the cone 5 decreases in this direction in the same manner. The cone 5 bears with an external lateral surface on the inner surface of the member 4.

The cone 5 has a central, cylindrical bore 51 which extends parallel to its longitudinal axis and through which the cable 3 is guided. The cone 5 tightly encloses the cable 3 and can be displaced thereon only by an external force. The height of the cone 5, that is to say its extent in the axial direction, is less than that of the member 4. On the side facing the seal, a conically annular gap 8 exists in front of the cone 5 between the cable 3 and the member 4.

Figure 2:
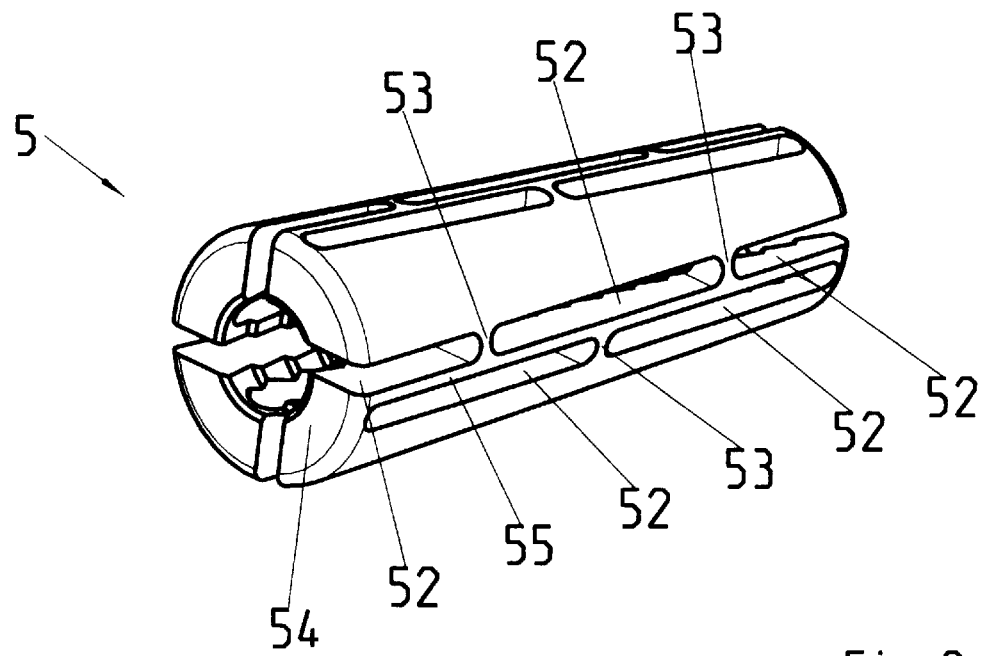
FIG. 2 shows a perspective view of the cone according to FIG. 1.
Figure 3:
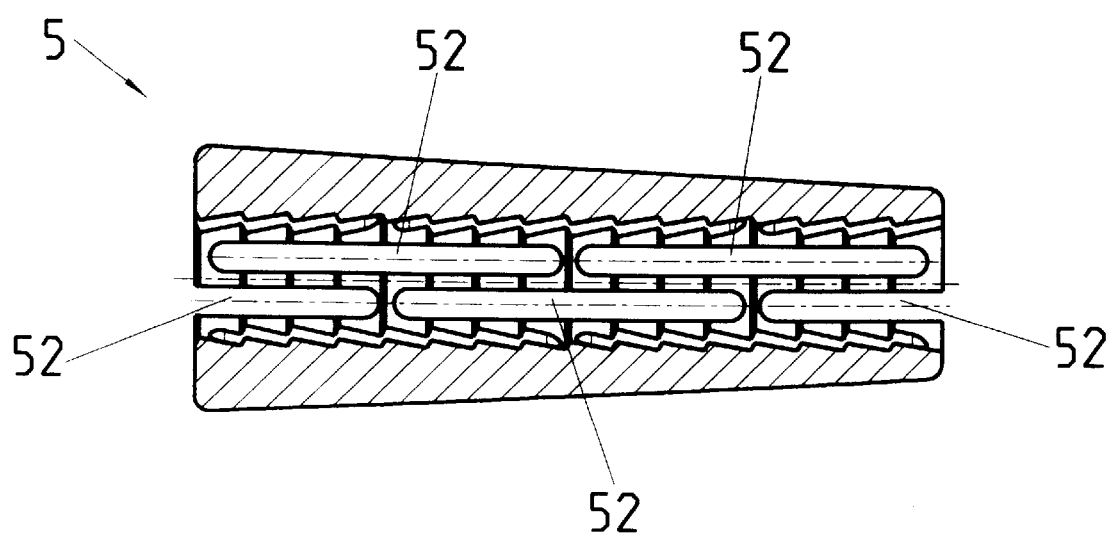
FIG. 3 shows a cut-away view of the cone according to FIG. 1.

FIG. 2 shows a perspective view and FIG. 3 a cut-away view of the cone 5. The latter has cut-outs 52 extending in the longitudinal direction and passing through the cone wall, as a result of which cut-outs the cone 5 can be compressed in a manner such that its internal diameter can be reduced by being pressed together.

The cut-outs 52 are arranged symmetrically in the cone 5. As a result the same force acts on all sides of the cable 3, irrespective of how strongly the cone S is compressed. No damage occurs to the cable 3 as a result of localized effects of force. The cut-outs 52 each have the shape of a gap. A web 53 extends between cut-outs 52 adjoining each other at their ends.

In the illustrated example of embodiment, the cut-outs 52 are arranged in four groups, distributed uniformly about the cone 5. Each group consists of two rows of cut-outs 52 arranged parallel to each other and parallel to the longitudinal axis of the cone. In the example of embodiment shown, one of the rows has two elongate cut-outs 52 which are so positioned that a web 53 exists between the two. The cut-outs 52 are closed, at each of their ends opposite the web 53, by an end surface 54 of the cone 5. The row adjoining this row has a cut-out 52 closed on both sides by webs 53 and two cut-outs 52 bordering the webs 53, approximately half as long and closed at one end only. The cut-out 52 of full length is arranged in the middle of the cone 5, relatively to its longitudinal axis. This cut-out 52 is adjoined by the cut-outs 52 which are half as long, each separated at the end by a web 53 from the cut-out 52 arranged in the middle. These cut-outs 52 are open at the end and pass through the respective end surface 54 of the cone 5.

As a result of this specific arrangement, each web 53 lies at the height of the center of the cut-out 52 extending parallel to it in each case. A wall strip 55 of the cone 5, extending in each case between the two rows, is of slight width and is therefore flexible. A force acting on the external lateral surface of the cone 5 causes its compression. When this occurs, the wall strips 55 undergo deflection and the size of the cut-outs 2 decreases.

The cone 5 consists of a rigid plastic, especially of a polyester, e.g. polybutyleneterephthalate, or a polyamide. Preferably, the same materials are used for the cone 5 and member 4. The effect of this is to ensure that the two components undergo the same thermal expansion.

As a result of the cut-outs 52 the cone 5 is compressible, although it consists of a material which, per se, is virtually incapable of elastic deformation. As a result, the advantages of a rigid, stable material are combined with those of an elastic material, specifically its deformability.

The internal diameter of the cone 5 in the unstressed state, i.e. when no force is acting on it, is dimensioned so that the cone 5 clings to the cable 3. Because of the deformability of the cone 5 it is possible to tighten the latter onto the cable 3 by slightly widening its internal diameter. It can be displaced along the cable 3 only by an exertion of force. This is further increased in that the inner lateral surface of the cone 5 is roughened. Preferably, it has a structuring consisting of saw-toothed grooves running around in an annular manner. It thus has a surface which is modelled on fish scales. This structuring can be seen in FIG. 3.

Once the cone 5 is pushed onto the cable 3, it is impossible to lose it, for example as a result of inattention.

In the installation of the cable probe device, the cable is introduced through the cable exit aperture 111 into the housing 1, the sealing member 6 and the cylindrical member 4 are pushed over the cable 3, and the cone 5 is pushed to th e desired position on the cable 3, if the cable 3 is longer than necessary for the specific application, a superfluous cable section is cut off. If appropriate, the strands of the cabled wire in the cable are to be connected to appropriate connectors in the housing 1. In order for the sealing member 6 to exert its effect, the pressure screw 7 is to be tightened. No further steps are necessary.

Since the cone 5 is not displaceable along the cable 3 without an external force, a tensile force exerted on the cable 3 in the direction away from the housing causes a movement of the cable 3 and of the cone 5 in the member 4 in the direction toward the seal. The internal diameter of the member 4 decreases in this direction. Since the member 4 is rigid, the cone 5, as a result of its movement in the direction toward the seal undergoes a counter-force because of its conical shape which has a force component directed radially toward its center. As a result of this, it is compressed and its internal diameter is reduced. The smaller the angle of taper of the cone 5, i.e. the greater its length in comparison to the difference between its largest and smallest external diameters, the greater is the force component directed radially toward its center, by which the cable 3 is retained. Because of this force component, the structuring of the internal lateral surface digs into the surface of the cable 3. There is thus a positive and a non-positive connection between the cone 5 and the cable 3.

The cable 3 is clamped in the cone 5. The greater the tensile force acting, the more stress-resistant this clamping is. In this arrangement, the structuring of the internal surface of the cone 5 has a supporting effect. Once a tensile force has been exerted on the cable 3, the cone 5 is clamped thereby in the member 4. If the pressure screw 7 is released, the member 4 can again be removed from the housing 1 with the cone 5.

It is not absolutely necessary to design the member 4 as a separate component. It can equally well be an integral constituent of the section 11 of the housing 1. This may then have a correspondingly reduced overall size. In such an embodiment, however, there is no guarantee that the cone 5 can be readily removed from the section 11.

The fixing of the cable by means of the cone 5 that has been described requires only very little space. The section 11 can therefore have a very small external diameter and can thus be inserted even into very narrow container apertures. In the case of a cable 3 having a diameter of 8 mm, the external diameter of the section 11 can be, for example, approximately 25 mm.

The cone 5 and the member 4 may be plastics injection moldings and are thus economical to produce.

Such a cable probe device is also insensitive to vibrations. Even if vibrations, arising for example because of pumps or stirrers arranged on a vessel, result in the clamping of the cone 5 in the member 4 being released in the absence of a tensile force, the clamping is automatically restored again by a tensile force taking effect at a later time.

We claim:

1. A cable probe device, comprising:
   a housing fixed at a measuring location;
   a probe;
   a cable leading from the housing to the probe; and
   a cable fixing device arranged on the housing, wherein the cable fixing device comprises
      a member having an axial, conical internal bore that tapers in a direction away from the housing;
      a cone arranged in said axial, conical internal bore that tapers in a direction away from the housing, the cone comprising:
         a first end surface and a second end surface,
         an axial cylindrical bore through which the cable is guided and that tightly encloses the cable such that the cable can be displaced therefrom only by an external force, and a plurality of cut-outs that each extend in the longitudinal direction of the cone, pass through the wall of the cone and break no more than one of the first end surface and the second end surface, the plurality of cut-outs enabling the cone to be compressed in a radial direction such that an internal diameter of the cone defined by the axial cylindrical bore is reduced.

2. The cable probe device of claim 1, wherein:
   the member is arranged in a section of the housing and rests on a sealing member and the sealing member encompasses the cable and rests on a step adjoining a cable exit aperture of the section.

3. The cable probe device of claim 1, wherein an inner lateral surface of the axial cylindrical bore of the cone is roughened.

4. The cable probe device of claim 1, wherein an inner lateral surface of the axial cylindrical bore of the cone comprises a plurality of annular saw-toothed grooves.

5. The cable probe device of claim 1, wherein the plurality of cut-outs are arranged symmetrically in the cone.

6. The cable probe device of claim 1, wherein:
   said cone comprises a first end surface and a second end surface,
   said first end surface is broken by at least one of said plurality of cut-outs, and
   said second end surface is broken by at least one of said plurality of cut-outs.

7. The cable probe device of claim 1, wherein the cone is manufactured from a rigid plastic.

8. The cable probe device of claim 1, wherein the cone is manufactured from a polyester.

9. The cable probe device of claim 1, wherein the cone is manufactured from polybutyleneterephalate.

10. The cable probe device of claim 1, wherein the cone is manufactured from a polymide.

11. A cable probe device, comprising:
    a housing fixed at a measuring location;
    a probe;
    a cable leading from the housing to the probe; and
    a cable fixing device arranged on the housing, wherein the cable fixing device comprises
       a member having an axial, conical internal bore that tapers in a direction away from the housing;
       a cone arranged in said axial, conical internal bore and that tapers in the direction away from the housing, the cone comprising
          an axial cylindrical bore through which the cable is guided, and that tightly encloses the cable such that the cable can be displace therefrom only by an external force, and
          a plurality of cut-outs that each extend in the longitudinal direction of the cone and pass through the wall of the cone, the plurality of cut-outs enabling the cone to be compressed in a radial direction such that an internal diameter of the cone defined by the axial cylindrical bore is reduced, wherein the plurality of cut-outs are each defined by a gap and a web extended between closely neighboring cut-outs of the plurality of cut-outs.

12. A cable probe device, comprising:
    a housing fixed at a measuring location;
    a probe;
    a cable leading from the housing to the probe; and
    a cable fixing device arranged on the housing, wherein the cable fixing device comprises
       a member having an axial, conical internal bore that tapers in a direction away from the housing;

a cone arranged in said axial, conical internal bore and that tapers in the direction away from the housing, the cone comprising an axial cylindrical bore through which the cable is guided, and that tightly encloses the cable such that the cable can be displace therefrom only by an external force, and a plurality of cut-outs that each extend in the longitudinal direction of the cone and pass through the wall of the cone, the plurality of cut-outs enabling the cone to be compressed in a radial direction such that an internal diameter of the cone defined by the axial cylindrical bore is reduced, wherein the plurality of cut-outs are arranged in a plurality of groups, each group of the plurality of groups comprising at least two rows of cut-outs of said plurality of cut-outs, the cut-outs of the at least two rows arranged parallel to each other and parallel to a longitudinal axis of the cone, and a narrow wall strip between the at least two rows of cut-outs.

13. The cable probe device of claim 12, wherein a first row of the at least two rows of cut-outs comprises a plurality of webs, each web of the plurality of webs placed perpendicularly between at least two cut-outs of the first row and at a midpoint of at least one cut-out extending parallel to the first row in an adjoining row of the at least two rows of cut-outs.

* * * * *